(12) United States Patent
Kolavennu et al.

(10) Patent No.: US 12,014,561 B2
(45) Date of Patent: Jun. 18, 2024

(54) IMAGE READING SYSTEMS, METHODS AND STORAGE MEDIUM FOR PERFORMING GEOMETRIC EXTRACTION

(71) Applicant: U.S. Bank National Association, Minneapolis, MN (US)

(72) Inventors: Soumitri Naga Kolavennu, Plymouth, MN (US); Ankur Tomar, Minneapolis, MN (US); Varshini Sriram, Minneapolis, MN (US); Rodolfo Carriedo Roque, Apple Valley, MN (US); Lavanya Basavaraju, Minneapolis, MN (US); Bryan Lee Stuhlsatz, Merrifield, MN (US)

(73) Assignee: U.S. Bank National Association, Minneapolis, MN (US)

( * ) Notice: Subject to any disclaimer, the term of this patent is extended or adjusted under 35 U.S.C. 154(b) by 409 days.

(21) Appl. No.: 17/569,121

(22) Filed: Jan. 5, 2022

(65) Prior Publication Data

US 2022/0319216 A1 Oct. 6, 2022

Related U.S. Application Data

(60) Provisional application No. 63/169,789, filed on Apr. 1, 2021.

(51) Int. Cl.
*G06V 30/414* (2022.01)
*G06V 10/50* (2022.01)
*G06V 10/778* (2022.01)
*G06V 30/18* (2022.01)

(52) U.S. Cl.
CPC ........... *G06V 30/414* (2022.01); *G06V 10/50* (2022.01); *G06V 10/778* (2022.01); *G06V 30/18086* (2022.01)

(58) Field of Classification Search
None
See application file for complete search history.

(56) References Cited

U.S. PATENT DOCUMENTS 10,579,653 B2   3/2020 Daher et al.
11,599,516 B1 *  3/2023 Sorenson ............ G06F 16/2282
(Continued)

OTHER PUBLICATIONS

Schölch, Lukas, et al. "Towards Automatic Parsing of Structured Visual Content through the Use of Synthetic Data." 2022 26th International Conference on Pattern Recognition (ICPR). IEEE, 2022. (Year: 2022).*

(Continued)

*Primary Examiner* — Michelle M Entezari Hausmann
(74) *Attorney, Agent, or Firm* — Merchant & Gould P.C.

(57) ABSTRACT

Geometric extraction is performed on an unstructured document by recognizing textual blocks on at least a portion of a page of the unstructured document, generating bounding boxes that surround and correspond to the textual blocks, determining search paths having coordinates of two endpoints and connecting at least two bounding boxes, and generating a graph representation of the at least a portion of the page, the graph representation including the plurality of textual blocks, the coordinates of the vertices of each bounding box and the coordinates of the two endpoints of each search path.

20 Claims, 10 Drawing Sheets

(56) References Cited

U.S. PATENT DOCUMENTS

| | | | |
|---|---|---|---|
| 2010/0146473 A1* | 6/2010 | Srivastava | G06F 30/394 |
| | | | 716/129 |
| 2018/0129944 A1 | 5/2018 | Meunier et al. | |
| 2019/0156115 A1 | 5/2019 | Cohen et al. | |
| 2019/0286691 A1 | 9/2019 | Sodhani et al. | |
| 2020/0242348 A1 | 7/2020 | Ast | |
| 2021/0224568 A1* | 7/2021 | Zhang | G06V 30/153 |
| 2023/0153335 A1* | 5/2023 | McNeill | G06F 16/316 |
| | | | 707/741 |

OTHER PUBLICATIONS

Peng, Dezhi, et al. "Pagenet: Towards end-to-end weakly supervised page-level handwritten chinese text recognition." International Journal of Computer Vision 130.11 (2022): 2623-2645. (Year: 2022).*

Suwa, Misako. "Segmentation of connected handwritten numerals by graph representation." Eighth International Conference on Document Analysis and Recognition (ICDAR'05). IEEE, 2005. (Year: 2005).*

He, K., et al., "Mask R-CNN," Facebook AI Research (FAIR), arXiv:1703.06870v3 [cs.CV] Jan. 24, 2018.

Kataria, S., et al., "Automatic Extraction of Data Points and Text Blocks from 2-Dimensional Plots in Digital Documents," Association for the Advancement of Artificial Intelligence (www.aaai.org) 2008.

* cited by examiner

300

Acme Bank
Global Fund Services

ABC Credit Fund, L.P.
Individual Statement of Capital Account
For the Period Ended February 29, 2020
(Expressed in US Dollar & Unaudited)

T1
V1 — Partner :
John and Jane Doe
Revocable Trust

T2
V2
Partner ID : ALT000338

Statement of Changes in Capital Account

T3

| | Month to Date | Year to Date |
|---|---|---|
| Beginning Net Capital Account Balance | $ 3,015,913 | $ 2,951,675 |

| 1000 | | | |
|---|---|---|---|
| | Data Extraction Result | Document ID: 78569872A2 — 1002 | |
| | | Data Extraction Time: 15:37 EST, January 12, 2021 — 1004 | |
| 1005 — Title | Value #1 — 1006 | Value #2 — 1007 | |
| 1005-1 — State | Virginia — 1006-1 | 1007-1 | |
| 1005-2 — Investment Advisor | XYZ Trust Advisors, LLC — 1006-2 | 1007-2 | |
| 1005-3 — Portfolio Manager | John Doe, CFA & Jane Doe — 1006-3 | 1007-3 | |
| 1005-4 — Portfolio Manager Name | John Doe — 1006-4 | Jane Doe — 1007-4 | |
| 1005-5 — Portfolio Manager Title/Certification/Degree | CFA — 1006-5 | 1007-5 | |
| 1005-6 — Custodian | ABC Bank — 1006-6 | 1007-6 | |
| 1005-7 — Portfolio Composition As of Date | 30-Sep-2019 — 1006-7 | 1007-7 | |
| 1005-8 — Portfolio Composition | TNOTE 67.9% AGCYMBS 10.7% BOND 10.4% AGCY 8.9% GOVDEBT 1.0% DCD 0.7% MUBD 0.4% — 1006-8 | 1007-8 | |
| 1008 — Confidence Score: HIGH | Do you Want to Open the Original Document to Review the Data Extraction Result? [Y] [N] — 1010 | | |

FIG. 10

IMAGE READING SYSTEMS, METHODS AND STORAGE MEDIUM FOR PERFORMING GEOMETRIC EXTRACTION

CROSS-REFERENCE TO RELATED APPLICATION

This application claims the benefit of provisional application Ser. No. 63/169,789, filed on Apr. 1, 2021, which application is incorporated herein by reference in its entirety.

TECHNICAL FIELD

Aspects described herein relate generally to an image reading system, a control method for controlling an image reading system, and a storage medium having stored therein a control method for performing geometric extraction.

BACKGROUND

Typical image reading systems (also commonly referred to as scanners) can be used to convert printed characters on paper documents into digital text using optical character recognition (OCR) software. The information captured and extracted from the paper documents is easier to archive, search for, find, share and use, and can enable faster and more intelligent decisions based on the information extracted therefrom.

Form-type documents (also referred to as forms, form templates or templates) can be in paper or electronic format. It is common for forms, for example, to be scanned into a digital format using an image reading system as described above. Typical image reading systems scan the form merely to generate an image version of it. Subsequently re-creating these forms into a structured digital format is usually performed manually, which is time consuming, tedious, and undesirable for users. Newer systems include recognition tools that can assist with this problem by performing analysis and data extraction on the image scan.

In contrast, electronic forms can sometimes include information pertaining to their structure, for example to indicate regions in which particular input fields are to be displayed. They can also include controls which behave differently depending on how users interact with them. For example, when a user selects a check box, a particular section may appear. Conversely, the section may disappear when the user clears the checkbox.

There exist multitudes of paper and electronic forms, however, that do not include well defined structures. This is, in part, because the information on forms can oftentimes be unstructured. Unstructured data (also referred to as unstructured information) is information that either does not have a pre-defined data model or is not organized in a pre-defined manner. Unstructured data is usually text-heavy, but may contain data such as names, dates, and numbers, to name a few. Irregularities and ambiguities in unstructured data make it difficult to understand using traditional OCR mechanisms as compared to data stored in fielded form such as data stored in databases or annotated in documents.

Typical generic methods that operate on unstructured form-like documents are limited in terms of what they can perform with respect to data extraction. Most require human intervention because unstructured form-like documents are neither in prose nor arranged structurally in a database that a typical form scanner or optical character recognition (OCR) processor or post processor can make sense of One technical challenge with electronic data extraction processes relates to the lack of a generic method that can be applied to various form-like documents. For instance, a method dedicated to a certain form template may not work well when being applied to another form template or certain form template changes. Moreover, manual processes pose significant data security issues. Therefore, it is desired to have a system and method for automated data extraction from unstructured form-like documents.

SUMMARY

In general terms, this disclosure is directed to an image reading system, a control method for controlling an image reading system, and a storage medium having stored therein a control method for performing geometric extraction. One aspect includes a method for processing a document having one or more pages, comprising: receiving an unstructured document; recognizing a plurality of textual blocks on at least a portion of a page of the unstructured document; generating a plurality of bounding boxes, each bounding box surrounding and corresponding to one of the plurality of textual blocks and having coordinates of a plurality of vertices; determining a plurality of search paths, each search path having coordinates of two endpoints and connecting at least two bounding boxes; and generating a graph representation of the at least a portion of the page, the graph representation including the plurality of textual blocks, the coordinates of the plurality of vertices of each bounding box and the coordinates of the two endpoints of each search path.

In some embodiments, the plurality of search paths include a plurality of horizontal search paths and a plurality of vertical search paths.

The at least two bounding boxes, in some embodiments, include a first bounding box, a second bounding box, and at least one intermediate bounding box between the first bounding box and the second bounding box. The plurality of horizontal search paths and the plurality of vertical search paths can also span across a plurality of pages of the unstructured document.

The plurality of bounding boxes, in some embodiments, are rectangular bounding boxes; and the plurality of vertices are one of: four vertices of each rectangular bounding box, and two opposite vertices of each rectangular bounding box.

In some embodiments, the plurality of bounding boxes are generated by a machine learning kernel, and the plurality of search paths are determined by the machine learning kernel.

In some embodiments, the method further comprises obtaining, from a descriptive linguistics engine, a plurality of target textual block pairs, each target textual block pair including a title textual block and at least one corresponding value textual block; searching the graph representation, along the plurality of search paths, to identify at least one of the target textual block pairs; and outputting the identified at least one of the target textual block pairs. The plurality of target textual block pairs can be generated by the machine learning kernel.

In some embodiments, the searching includes, in order: locating a first textual block; searching the graph representation, starting from the first textual block and along one of the plurality of horizontal search paths; and searching the graph representation, starting from the first textual block and along one of the plurality of vertical search paths.

In some embodiments, the method further includes searching the graph representation until a predetermined criterion is met. In some embodiments, searching the graph representation can be stopped after one of the target textual block pairs is identified. In some embodiments, searching the graph representation can stop after a first number of textual blocks have been searched.

In some embodiments, a non-transitory computer-readable medium is provided which stores instructions. When the instructions are executed by one or more processors, the processors operate to perform the methods herein.

In another aspect of the invention, there is provided a system for extracting data from a document having one or more pages, comprising: a processor; an input device configured to receive an unstructured document; a machine learning kernel coupled to the processor; a geometric engine coupled to the machine learning kernel and configured to: recognize a plurality of textual blocks on at least a portion of a page of the unstructured document; generate a plurality of bounding boxes, each bounding box surrounding and corresponding to one of the plurality of textual blocks and having coordinates of a plurality of vertices; determine a plurality of search paths, each search path having coordinates of two endpoints and connecting at least two bounding boxes; and generate a graph representation of the at least a portion of the page, the graph representation including the plurality of textual blocks, the coordinates of the plurality of vertices of each bounding box, and the coordinates of the two endpoints of each search path; a descriptive linguistic engine coupled to the machine learning kernel and configured to: generate a plurality of target textual block pairs, each target textual block pair including a title textual block and at least one corresponding value textual block; and search the graph representation, along the plurality of search paths, to identify at least one of the target textual block pairs; and an output device configured to output the identified at least one of the target textual block pairs.

The plurality of search paths can include a plurality of horizontal search paths and a plurality of vertical search paths. The plurality of horizontal search paths and the plurality of vertical search paths can span across a plurality of pages of the unstructured document.

The descriptive linguistics engine can further be configured to search the graph representation until a predetermined criterion is met.

The plurality of bounding boxes can be rectangular bounding boxes; and the plurality of vertices are one of: four vertices of each rectangular bounding box, and two opposite vertices of each rectangular bounding box.

The plurality of bounding boxes can be generated by a machine learning kernel, and the plurality of search paths are determined by the machine learning kernel. The descriptive linguistics engine can also obtain a plurality of target textual block pairs, each target textual block pair including a title textual block and at least one corresponding value textual block; The system can also search the graph representation along the plurality of search paths to identify at least one of the target textual block pairs and output the identified at least one of the target textual block pairs.

In some embodiments, the plurality of target textual block pairs are generated by the machine learning kernel.

The system can further operate to, in order: locate a first textual block; search the graph representation, starting from the first textual block and along one of the plurality of horizontal search paths; and search the graph representation, starting from the first textual block and along one of the plurality of vertical search paths.

The system can also operate to stop searching the graph representation after one of the target textual block pairs is identified. The system can also operate to stop searching the graph representation after a first number of textual blocks have been searched.

BRIEF DESCRIPTION OF THE DRAWINGS

FIG. 3 is a diagram illustrating an example document.

FIG. 10 is a data extraction result corresponding to the document of FIG. 9.

DETAILED DESCRIPTION

Figure 1:
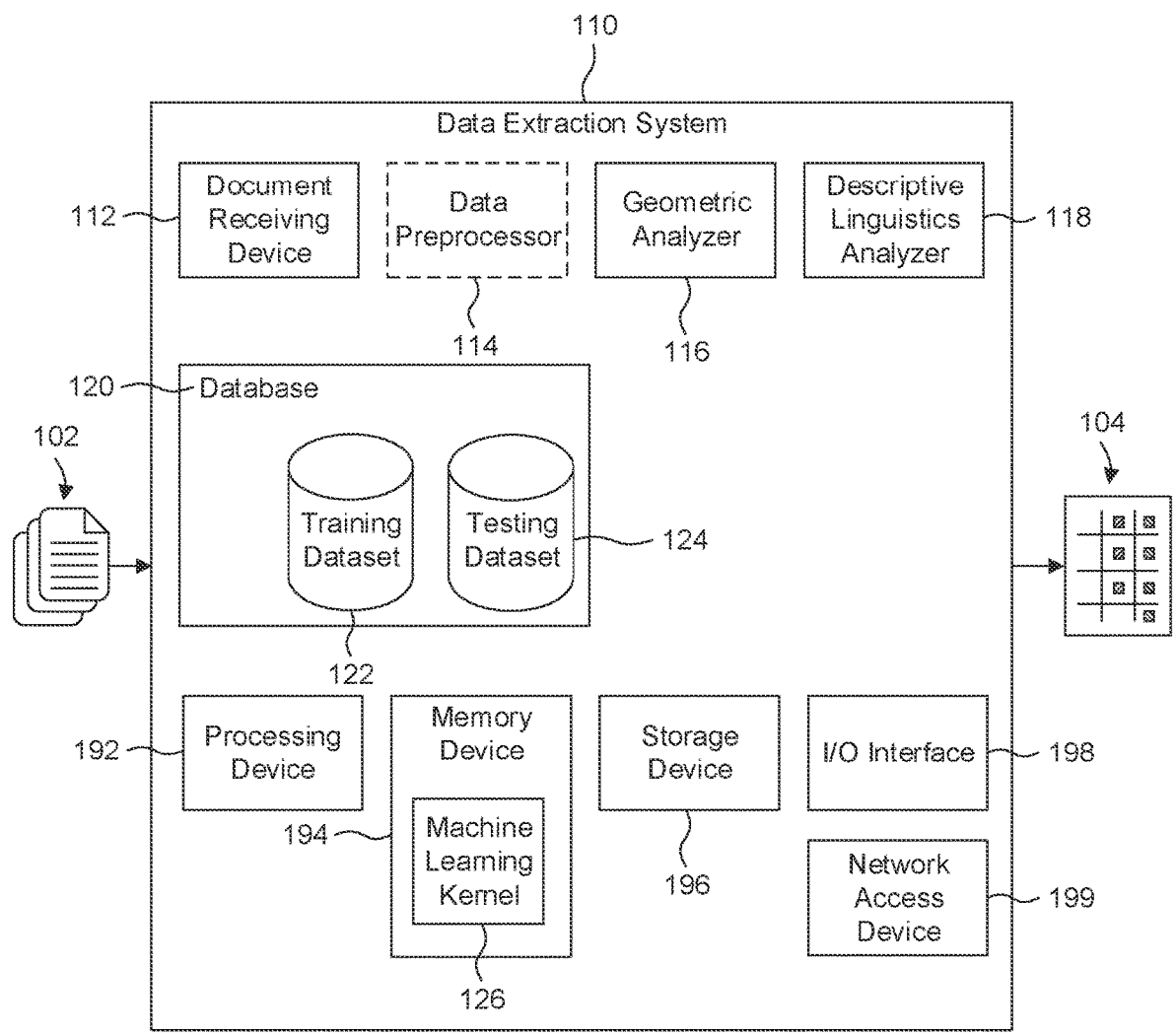
FIG. 1 is a diagram illustrating a data extraction system according to an example embodiment.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

This disclosure addresses problems of the prior art by introducing an image reading system, a control method for controlling an image reading system, and a storage medium having stored therein a control method for performing geometric extraction. In an example use case, the systems, methods, and computer products described herein perform computer-aided information extraction from generic form-like documents automatically without human intervention. Aspects of embodiments described herein provide artificial intelligence systems and methods that read these documents securely.

Form-like documents can vary. Examples of form-like documents include receipts, application forms, rental application forms, mortgage application forms, medical records, doctor prescriptions, restaurant menus, pay stubs, patent Application Data Sheets (ADS), trade documents, SEC filings (e.g., Form 10-K), company annual reports, company earnings reports, IRS tax forms (e.g., Form W-2, Form 1040, etc.), invoices, and bank statements. Some form-like documents like IRS tax forms are templatic, while other form-like documents such as company annual reports are non-templatic or multi-templatic. Aspects of the embodiments described herein are agnostic to the type of document.

A document can include one or more pages. Further, a document need not be a physical document. For example, a document may be an electronic document. An electronic document also may be in various formats such as Portable Document Format (PDF), spreadsheet format such as the Excel Open XML Spreadsheet (XLSX) file format, a webform such as HTML, form that allows a user to enter data on a web page that can be sent to a server for processing. Webforms can resemble paper or database forms because web users fill out the forms using checkboxes, radio buttons, or text fields via web pages displayed in a web browser. An electronic document may be stored either on a local electronic device such as a mobile device, personal computer (PC), or on an online database accessible from the Internet.

FIG. 1 is a diagram illustrating a data extraction system 110 according to an example embodiment. Generally, the data extraction system 110 is used to receive a document 102, extract data from the document 102, and generate a data extraction result 104. As described above, the document 102 can include one or more pages, and the document 102 can be either physical or electronic in various formats.

In the example of FIG. 1, the data extraction system 110 includes a document receiving device 112, a geometric analyzer 116, a descriptive linguistics analyzer 118, a database 120, a processing device 192, a memory device 194, a storage device 196, and an input/output (I/O) interface 198. In some embodiments, data extraction system 110 include a data preprocessor 114. It should be noted that the data extraction system 110 may include other components not expressly identified here.

In some embodiments, document receiving device 112 receives document 102. In cases where document 102 is a physical document, the document receiving device 112 may be a document intake mechanism that moves the document through the data extraction system 110. In cases where the document 102 is an electronic document, the document receiving device 112 may be a component that is configured to communicate with a sender of the document to receive the electronic document. For simplicity, document 102 is a one-page document unless otherwise indicated. It should be understood, however, that the example embodiments described herein are equally applicable to a multi-page document.

The received document 102 may be preprocessed by the data preprocessor 114 once it is received by the document receiving device 112. The data preprocessor 114 preprocess the received document 102 by carrying out one or more preprocessing steps that facilitate data extraction that occurs later. The preprocessing steps can include one or more of the following: (i) scanning; (ii) optical character recognition (OCR); (iii) page segmentation; (iv) intra-page segmentation; and (v) storing the preprocessed document.

The geometric analyzer 116 and descriptive linguistics analyzer 118 work together to recognize, extract and associate data from document 102. Generally, geometric analyzer 116 generates a graph representation of document 102 based on geometric characteristics of the document 102, whereas the descriptive linguistics analyzer 118 provides information on what specific information contained in the document are relevant. A graph representation, as used herein, is a mathematical structure used to model pairwise relations between objects. For example, a graph in this context can be made up of vertices (also called nodes or points) which are connected by edges (also called links or lines). Additionally, the descriptive linguistics analyzer 118 may also be used to review the graph representation generated by the geometric analyzer 116 and provide guidance on how to correct or adjust the graph representation, if necessary.

In some embodiments, geometric analyzer 116 and descriptive linguistics analyzer 118 are coupled to a machine learning kernel 126. Details of the geometric analyzer 116, the descriptive linguistics analyzer 118, and the machine learning kernel 126 are described below with reference to FIGS. 2-10.

In an example embodiment, the processing device 192 includes one or more central processing units (CPU). In other embodiments, the processing device 192 may additionally or alternatively include one or more digital signal processors, field-programmable gate arrays, or other electronic circuits as needed.

The memory device 194, coupled to a bus, operates to store data and instructions to be executed by processing device 192, geometric analyzer 116 and/or descriptive linguistics analyzer 118. The memory device 194 can be a random access memory (RAM) or other dynamic storage device. The memory device 194 also may be used for storing temporary variables (e.g., parameters) or other intermediate information during execution of instructions to be executed by processing device 192, geometric analyzer 116 and/or descriptive linguistics analyzer 118. As shown in FIG. 1, the machine learning kernel 126 is stored in the memory device 194. It should be noted that the machine learning kernel 126 may alternatively be stored in a separate memory device in some implementations.

The storage device 196 may be a nonvolatile storage device for storing data and/or instructions for use by processing device 192, geometric analyzer 116 and/or descriptive linguistics analyzer 118. The storage device 196 may be implemented, for example, with a magnetic disk drive or an optical disk drive. In some embodiments, the storage device 196 is configured for loading contents of the storage device 196 into the memory device 194.

I/O interface 198 includes one or more components which a user of the data extraction system 110 can interact. The I/O interface 198 can include, for example, a touch screen, a display device, a mouse, a keyboard, a webcam, a microphone, speakers, a headphone, haptic feedback devices, or other like components.

The network access device 199 operates to communicate with components outside the data extraction system 110 over various networks. Examples of the network access device 199 include one or more wired network interfaces and wireless network interfaces. Examples of such wireless network interfaces of the network access device 199 include wireless wide area network (WWAN) interfaces (including cellular networks) and wireless local area network (WLANs) interfaces. In other implementations, other types of wireless interfaces can be used for the network access device 199.

The database 120 is configured to store data used by machine learning kernel 126, geometric analyzer 116, and/or descriptive linguistics analyzer 118. As shown in FIG. 1, database 120 includes at least one training dataset 122 and at least one testing dataset 124. The machine learning kernel 126 uses the training dataset 122 to train the machine learning model(s) and uses the testing dataset 124 to test the machine learning model(s). After many iterations, the machine learning kernel 126 becomes better trained for performing its part in data extraction. Database 120 can also store new data related to the document 102, such as data related to document 102 or data extraction result 104 that is entered by a user. Database 120 can thus be dynamic and accumulate additional data over time.

Figure 2:
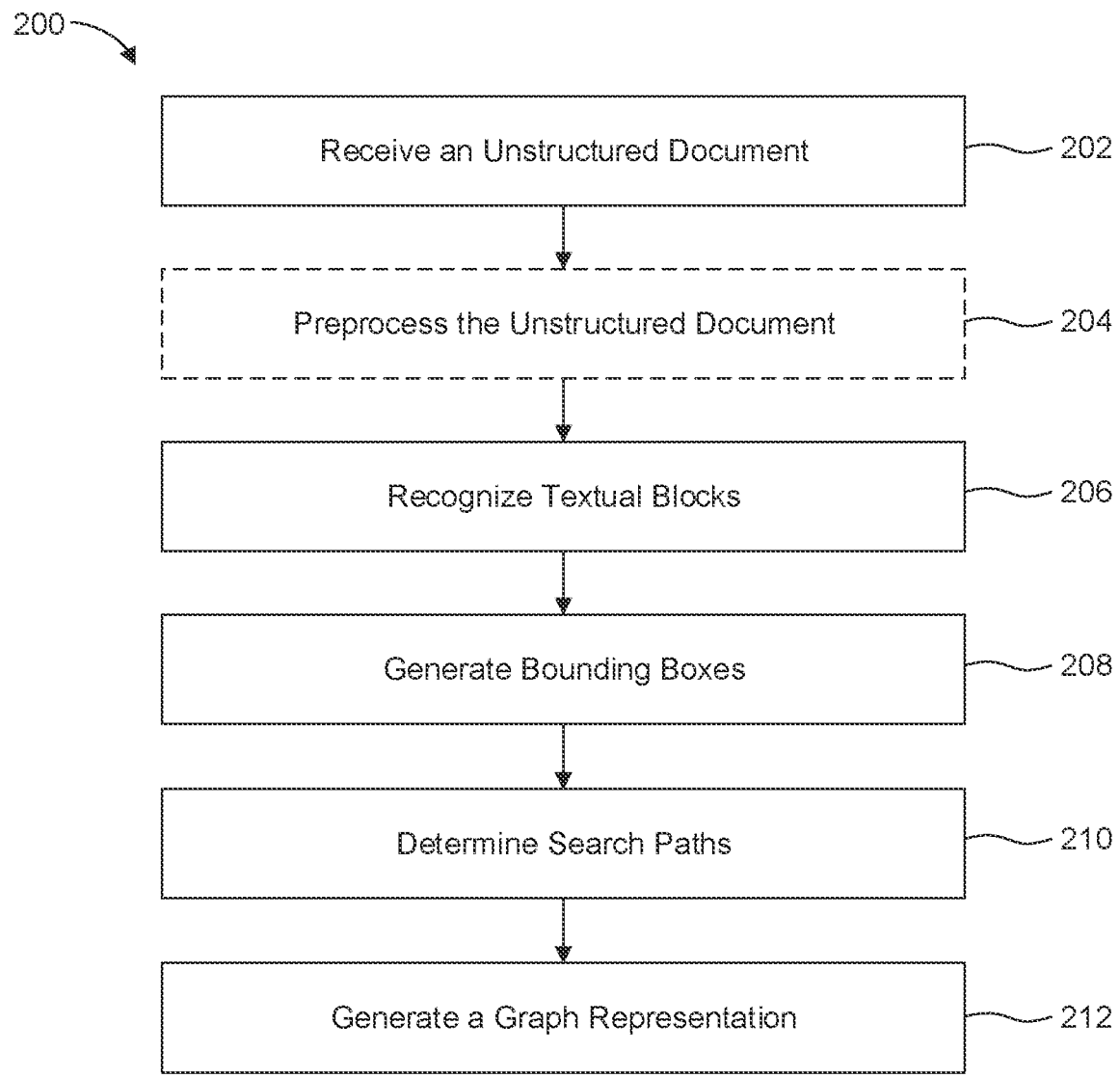
FIG. 2 is a flowchart diagram illustrating a process of processing a document according to an example embodiment.
Figure 4:
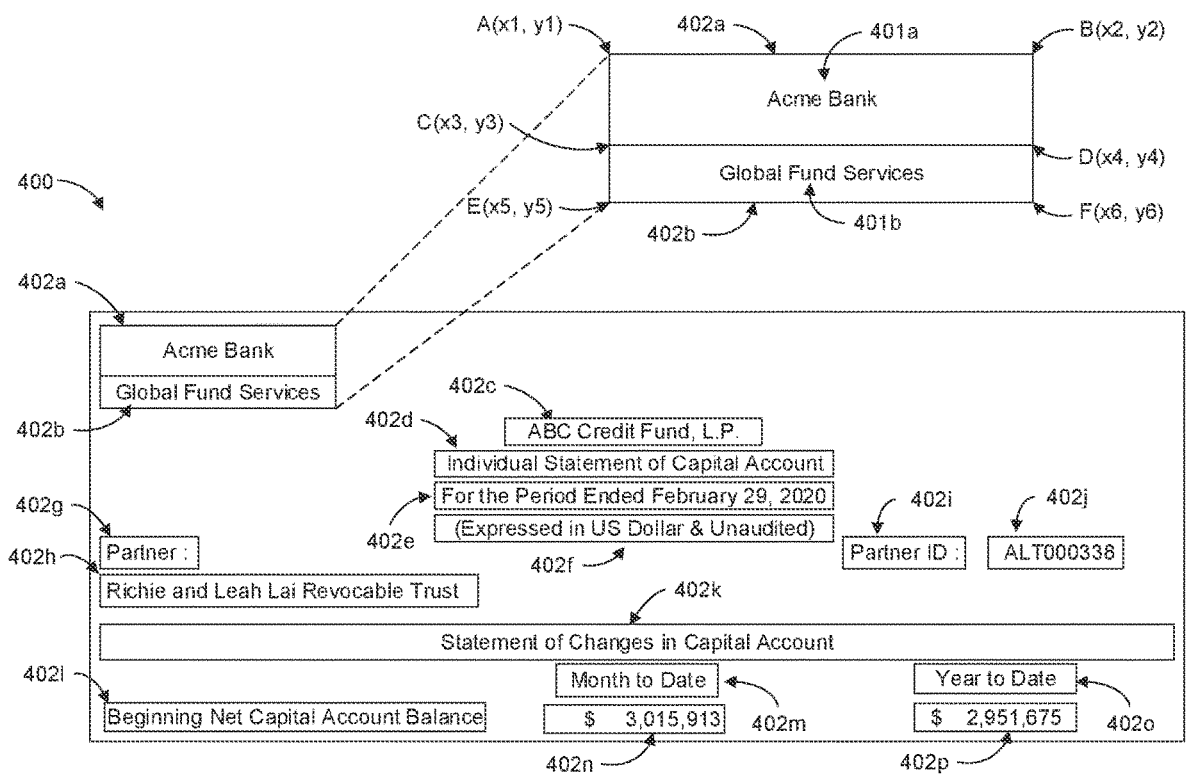
FIG. 4 is a diagram illustrating the processed document having bounding boxes corresponding to the example document of FIG. 3.
Figure 5:
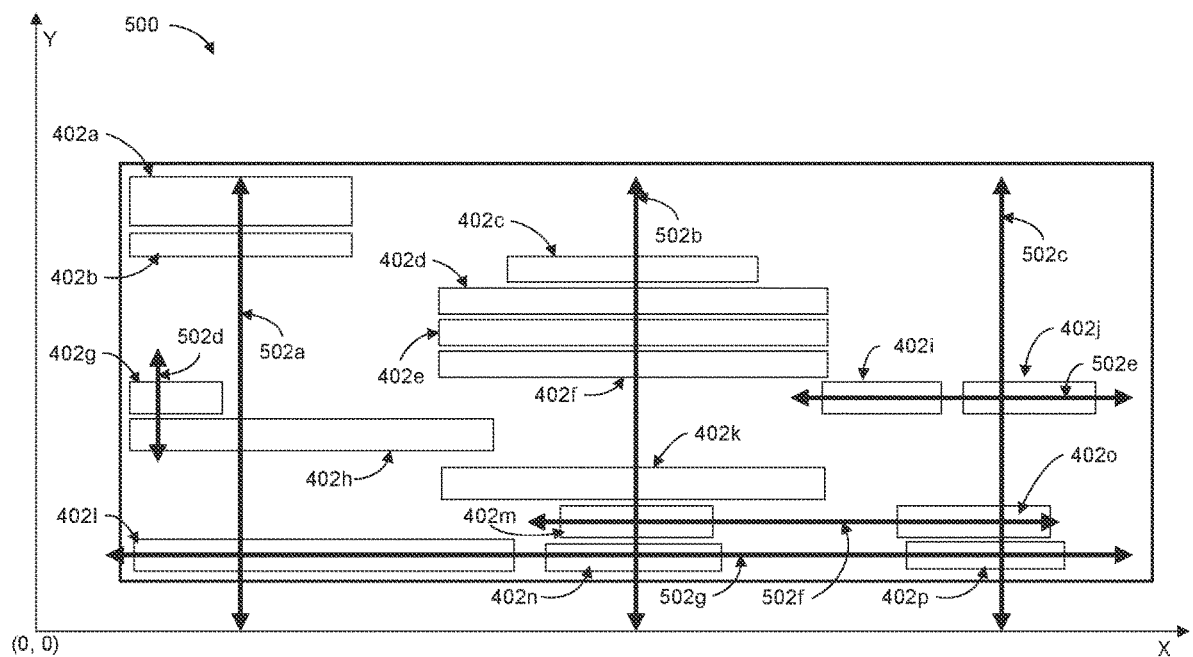
FIG. 5 is a diagram illustrating example graphical indicia overlaying the example document of FIG. 3.

FIG. 2 is a flowchart diagram illustrating a process 200 of processing a document according to an example embodiment. FIG. 3 is a diagram illustrating an example document 300. FIG. 4 is a diagram illustrating the processed document 400 having bounding boxes corresponding to the example document 300 of FIG. 3. FIG. 5 is a diagram illustrating example graphical indicia 500 overlaying the example document 300 of FIG. 3. The graphical indicia 500 are, as explained herein, implemented as graph representations (e.g., mathematical structures) generated by geometric analyzer 116 of data extraction system 110. Accordingly, the example graphical indicia 500 are shown for illustrative purposes.

As shown in FIG. 2, the process 200 includes operations 202, 204, 206, 208, 210, and 212. In some embodiments, operation 204 is optional. At operation 202, an unstructured document is received. In one implementation, the unstructured document is received by the document receiving device 112 of FIG. 1. It should be noted although the data extraction system 110 is equipped for data extraction from unstructured documents, it can also be used to extract data from various types of documents, including documents that contain information that have structure, unstructured or a combination of both structured and unstructured information.

Document 300 of FIG. 3 is an example of the unstructured document received at operation 202. As shown in FIG. 3, document 300 is an example individual statement of a capital account. As mentioned above, the techniques described in the disclosure are generally applicable to all documents regardless of subject matter and industry. In the example of FIG. 3, document 300 includes multiple titles (each referred to as a "titles") and corresponding values (each referred to as a "value"). For instance, "Partner" is a title T1, and "John and Jane Doe Revocable Trust" is a value V1 corresponding to title T1. In other words, the title T1 and the value V1 are associated, and are the target data to be extracted. Similarly, "Partner ID" is a title, title T2, and "ALT000338" is a value V2, corresponding to title T2. In some embodiments, it is possible to that title corresponds to multiple values. For example, "Beginning Net Capital Account Balance" is a title T3, whereas "3,015,913" is one corresponding value V3-1 and "2,951,675" is another corresponding value V3-2. In some examples, multiple titles correspond to one value.

Referring again to FIG. 2, in some embodiments, at operation 204, the unstructured document is preprocessed. In one implementation, the unstructured document is preprocessed by the data preprocessor 114 of FIG. 1. In some embodiments, the unstructured document, which is a physical document rather than an electronic document, may be scanned. In some embodiments, the unstructured document may go through an optical character recognition (OCR) process to convert images of typed, handwritten or printed text into machine-encoded text. In yet some embodiments, the unstructured document, which has multiple pages, may be segmented into separate pages. In some embodiments, each of those separate pages may further be segmented into various portions (each portion may be referred to as a "section"). It should be noted that other preprocessing processes may be employed as needed.

A textual block is text grouped together. Often, the text takes on the shape of a square or rectangular "block" however the embodiments described can operate on textual blocks having shapes other than a square or a rectangle. At operation 206, textual blocks in the unstructured document are recognized. In one implementation, textual blocks in the unstructured document are recognized by the geometric analyzer 116 of FIG. 1. A textual block is a collection of texts. A textual block can extend either horizontally or vertically. A textual block can extend in a manner other than horizontally or vertically (e.g., diagonally). As shown in the example of FIG. 4, "Acme Bank" is a textual block 401a, whereas "Global Fund Services" is another textual block 401b. Textual blocks, including 401a and 401b, are individually sometimes referred to as a textual block 401 and collectively as textual blocks 401. Recognition of the textual blocks 401 may be based on the process such as OCR at operation 204, in some implementations.

In some embodiments, each term (e.g., a number, an alphanumerical, a word, or a group of words, a phrase, and the like) in the document may be used to generate a corresponding textual block 401. In other embodiments, two or more terms (e.g., Social Security Number) may be combined to form a single textual block 401. In some embodiments, sometimes one term corresponds to a textual block 401, and sometimes two or more terms correspond to a textual block 401.

At operation 208, a bounding box is generated for each of the textual blocks recognized at operation 206. A bounding box is a box surrounding its corresponding textual block. In some embodiments, a bounding box is rectangular. A bounding box may have other shapes as needed. As shown in FIG. 4, a bounding box 402a is generated for the textual block 401a, whereas a bounding box 402b is generated for the textual block 401b. Bounding boxes, including 402a and 402b, are individually sometimes referred to as a bounding box 402 and collectively referred to as bounding boxes 402. Geometric information as used herein means the properties of space that are related with distance, shape, size and relative positions of a figure. In the example aspects herein, the figure corresponds to a bounding box. The geometric information of the bounding boxes 402 are generated and saved in memory.

In one implementation, geometric information of bounding boxes 402 includes coordinates of multiple vertices of each bounding box 402. The origin of the coordinate plane may be chosen to be at a point that makes the coordinates of the multiple vertices capable of being expressed as values that can be stored in a memory. As in the example of FIG. 4, bounding box 402a has four vertices, namely vertex A with coordinates (x1, y1), vertex B with coordinates (x2, y2), vertex C with coordinates (x3, y3), and vertex D with coordinates (x4, y4). Bounding box 402b has four vertices, namely vertex C with coordinates (x3, y3), vertex D with coordinates (x4, y4), vertex E with coordinates (x5, y5), and vertex F with coordinates (x6, y6). When a bounding box is rectangular, two of the four vertices are needed to determine the geometric information of the bounding box. For instance, the geometric information of the bounding box 402a can be determined if the coordinates of the vertex A (x1, y1) and the vertex D (x4, y4) are known.

In other embodiments, for example where a bounding box is rectangular and extends either horizontally or vertically, geometric information of the bounding boxes 402 may include coordinates of the centroid of the bounding box, a width in the horizontal direction, and a height in the vertical direction.

In the example of FIG. 4, multiple bounding boxes 402 are associated with document 400 (e.g., bounding boxes 402a, 402b, 402c, 402d, 402e, 402f, 402g, 402h, 402i, 402j, 402k, 402l, 402m, 402n, 402o, 402p, and the like). Each of those bounding boxes 402 surrounds a corresponding textual block and has its own size.

Referring again to FIG. 2, in some implementations, operation 206 (recognizing textual blocks) and operation 208 (generating bounding boxes) can be conducted using the machine learning kernel 126 of FIG. 1. In some examples, the bounding boxes 402 are generated using a machine learning model that learns a character set of the document (e.g., Latin script, Indic scripts, mandarin scripts, and the like). In addition, the machine learning model may be built to combine a sequence of characters into a word and declare the word as a textual block 401. When appropriate, the machine learning model may also be trained to be used to combine closely related words (e.g., an e-mail address and a phone number) into a single textual block 401 instead of two textual blocks 401. The textual blocks 401 can be determined in a number of now known or future developed ways. For example, in one implementation, the textual blocks 401 are determined by calculating the mean character distance and detecting textual blocks 401 where the mean character distance meets a threshold. The threshold can be set more precise over time after training. In other implementations, language models, n-grams and wordnet collections may be used by the machine learning model. Furthermore, in some embodiments the machine learning model utilizes the learnings from the descriptive linguistics analyzer 118 to combine words corresponding to the application that is being trained (e.g., using n-grams to determine the relationship of the words). Once the textual blocks are recognized, bounding boxes are generated accordingly using the machine learning kernel 126. Bounding boxes are determined to encompass the whole word. In some embodiments, the bounding boxes are also constructed in combination with surrounding words so that center aligned, left aligned and right alignment is recognized. In some embodiments more than one bounding box can overlap. For example, one word can be part of two bounding boxes. In some embodiments, the bounding boxes are rectangular and the machine learning kernel is trained on those rectangular bounding boxes. In other embodiments, the machine learning kernel can be trained using bounding boxes of other shapes (e.g., hexagonal).

A search path is a plot, by a computer application, of route between two points. In some embodiments, a single search path is determined. In some embodiments, multiple potential search paths are determined. A search path can be a vertical search path or a horizontal search path. In some embodiments, a search path is a diagonal search path or a nonlinear search path (e.g., curved).

If more than one search path is determined, the search path that is selected to be used need not be the shortest search path. Indeed, it may be more accurate to select a search path longer than other search paths that have been determined.

Referring again to FIG. 2, in this example implementation, at operation 210 multiple search paths are determined. In some implementations, the multiple search paths are determined by the geometric analyzer 116. Each of the multiple search paths has two endpoints and the coordinates of the endpoints are saved in memory. Each of the multiple search paths cover at least two bounding boxes 402. As described above, in some implementations, the search paths include both horizontal search paths and vertical search paths, but aspects of the embodiments herein are not so limited. It may be the case that the search paths are diagonal or non-linear. In some examples, a search path may connect two bounding boxes 402. In other examples, a search path may connect two bounding boxes 402 and at least one intermediate bounding box 402 therebetween.

In some implementations, operation 210 can be conducted using the machine learning kernel 126 of FIG. 1. FIG. 5 illustrates various search paths 502a, 502b, 502c, 502d, 502e, 502f, 502g. Herein, a search path is sometimes individually referred to as a search path 502 and multiple search paths are collectively referred to as search paths 502, correspondingly. In some examples, the machine learning model can establish the search paths 502 based on the detected orientation-related information of the bounding boxes 402. For example, all bounding boxes 402 that are aligned to the right of a document may be connected by a vertical search path 502, while all bounding boxes 402 that are aligned to the bottom of the document may be connected by a horizontal search path 502. In some embodiments, the horizontal and vertical search paths are determined in relation to a bounding box. For example, as shown in FIG. 5, search path 502d is obtained as a search path in relation to bounding box 402g, and involves 402h, whereas search path 502a is determined in relation to bounding box 402h, and involves 402a, 402b, 402l.

As shown in the example of FIG. 5, there are four vertical search paths 502a, 502b, 502c, and 502d and three horizontal search paths 502e, 502f, and 502g determined at operation 210. Vertical search paths 502a, 502b, 502c, and 502d and horizontal search paths 502e, 502f, and 502g are collectively referred to as the search paths 502. As described above, some search paths 502 (e.g., vertical search path 502d) may connect only two bounding boxes 402, while other search paths 502 (e.g., horizontal search paths 502g) may connect more than two bounding boxes. Generally, all bounding boxes 402 are covered by at least one search path 502. In some embodiments, a bounding box 402 is connected to other bounding boxes through one or more search paths 502.

At operation 212, a graph representation is generated. In some implementations, the graph representation includes information on the bounding boxes 402 and information on the search paths 502. In some examples, the information on the bounding boxes 402 may include coordinates of vertices of those bounding boxes 402, while the information on the search paths 502 may include coordinates of endpoints of those search paths 502.

Figure 6:
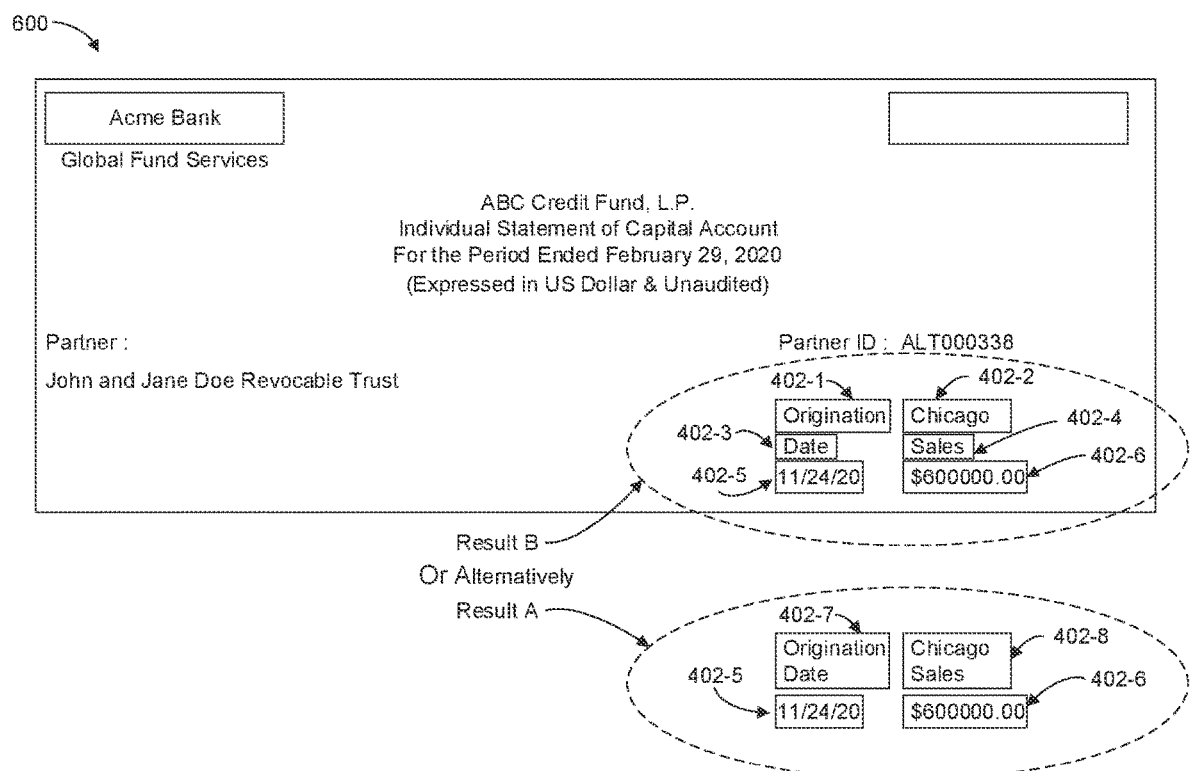
FIG. 6 is a diagram illustrating an example document where generated bounding boxes may be incorrect.

Sometimes the initial generated graph representation is not ideal. FIG. 6 illustrates an example document 600 illustrating generated bounding boxes, where the generated bounding boxes may be incorrect. As shown in the example of FIG. 6, the bottom right corner include some characters that can be interpreted differently, resulting in either the result A or the result B.

As shown in this example, in result A, "Origination Date" is recognized as a textual block 402-7 as a title, and "11/24/20" is recognized as a textual block 402-5 as its corresponding value; "Chicago Sales" is recognized as a textual block 402-8, and "$600000.00" is recognized as a textual block 402-6 as its corresponding value. Result A seems reasonable if the context of the document 600 is, for example, a travel agency or the like.

In result B, "Origination" is recognized as a textual block 402-1 as a title, and "Chicago" is recognized as a textual block 402-2 as its corresponding value; "Date" is recognized as a textual block 402-3, and "11/24/20" is recognized as a textual block 402-5 as its corresponding value; "Sales" is recognized as a textual block 402-4, and "$600000.00" is recognized as a textual block 402-6 as its corresponding value. Result B seems reasonable if the context of the document 600 is a bank statement or the like.

Therefore, geometric analyzer 116 of FIG. 1 alone, in some circumstances, may not be capable of determining which of result A and result B is better with a high confidence level. In situations like this, descriptive linguistics analyzer 118 may be used in cooperation with geometric analyzer 116. This enables context of a document to be used to determine the orientation of a search path 502. Advantageously, this improves the speed of the document scanning and data extraction, which in turn further can save significant computing resources, improve accuracy, and enables a more secure process (because less, if any, human corrective action is required).

Figure 7:
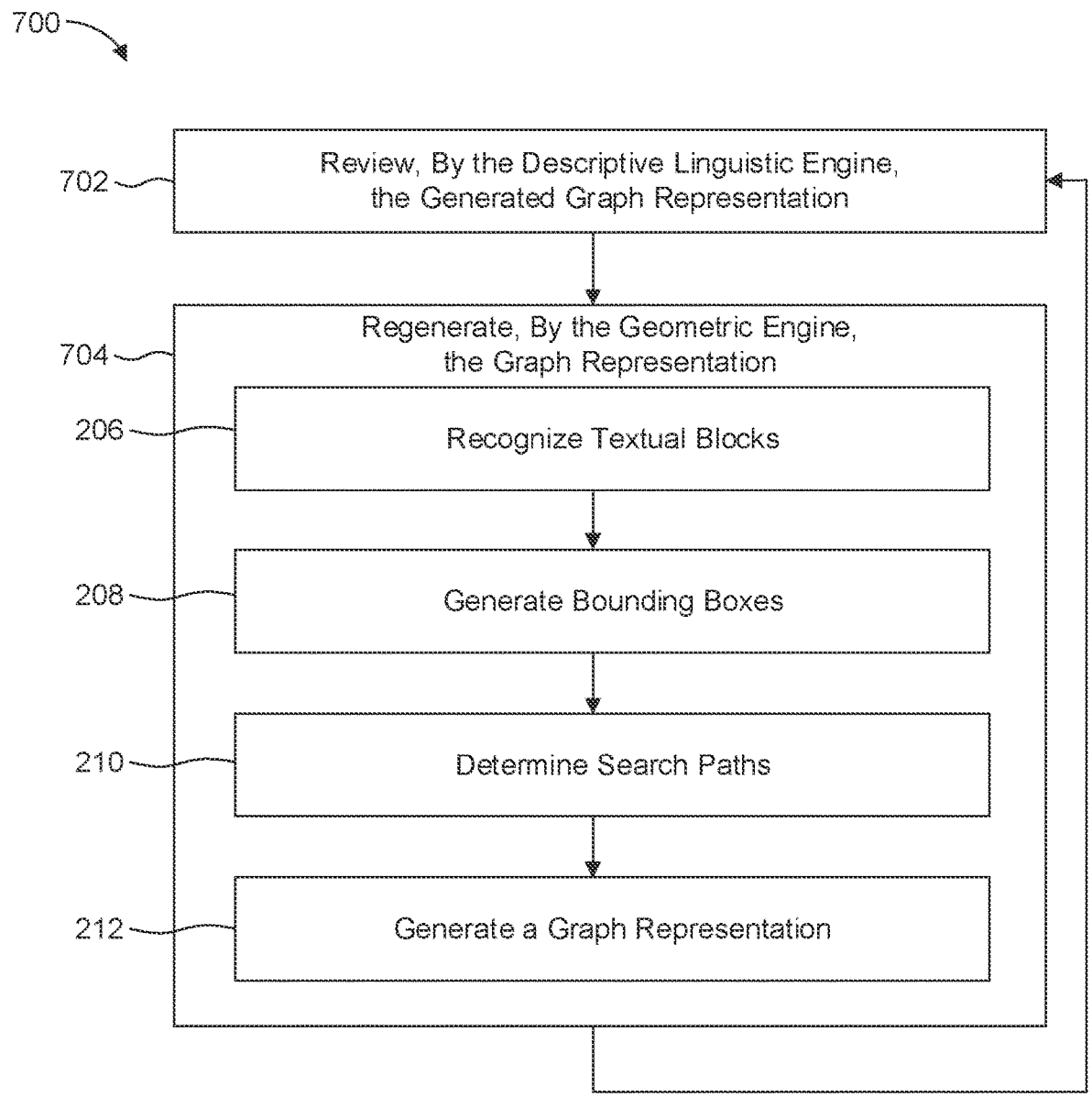
FIG. 7 is a flowchart diagram illustrating a process of regenerating the graph representation according to an example embodiment.

FIG. 7 is a flowchart diagram illustrating an example process 700 of regenerating the graph representation according to an example embodiment. The process 700 includes operations 702 and 704, and operation 704 further includes operations 206, 208, 210, and 212 of FIG. 2.

At operation 702, the generated graph representation is reviewed by the descriptive linguistics analyzer 118 of FIG. 1. In some implementations, the geometric analyzer 116 can generate confidence level scores for different textual blocks 401 and bounding boxes 402. In the example of FIG. 6, the confidence level scores for the bounding boxes 402-7 and 402-8 in result A may have a relatively low confidence level score (e.g., 61 out of 100). As a result, the descriptive linguistics analyzer 118 may review the generated graph representation and determine whether there is any error. In one implementation, the review could be based on subject matters or contexts of the document 600. In the example of FIG. 6, since the subject matter is a bank statement based on the title "ABC Credit Fund, L.P. Individual Statement of Capital Account," the descriptive linguistics analyzer 118, relying on the machine learning kernel 126 of FIG. 1 for example, can determine that Result A should be an error because it makes more sense when the context is a travel agency. As a result, the process 700 proceeds to operation 704.

A confidence level is the probability that the associations generated by the geometric extractor are related. The confidence level is generated by the machine learning kernel 126 based on the training data that the machine learning kernel 126 has either been trained or finetuned on. A linguistics analyzer can use machine learning kernels (e.g., recursive neural networks, transformers, and the like) to provide confidence scores on how two textual entities are related when they are part of a paragraph or a sentence. In some embodiments, the machine learning kernel combines both the linguistic analysis output learnings and geometric extractor output learnings to provide an overall confidence score on the associations.

At operation 704, the geometric analyzer 116 regenerates the graph representation. In other words, the geometric analyzer 116 may repeat operations 206, 208, 210, and 212 as shown in FIG. 7. After operation 704, a new graph representation 212 is generated. Then the process 700 circles back to operation 702, where the regenerated graph representation is revised by the descriptive linguistics analyzer 118 again. This process can continue for multiple iterations until the confidence level scores are good enough (e.g., above a threshold confidence level score). For instance, when the regenerated graph representation reflects the result B of FIG. 6, the process 700 ends. As such, the descriptive linguistics analyzer 118 serves as a correction mechanism for the geometric analyzer 116, utilizing the machine learning kernel 126 of FIG. 1 or any data stored in the database 120 of FIG. 1.

Figure 8:
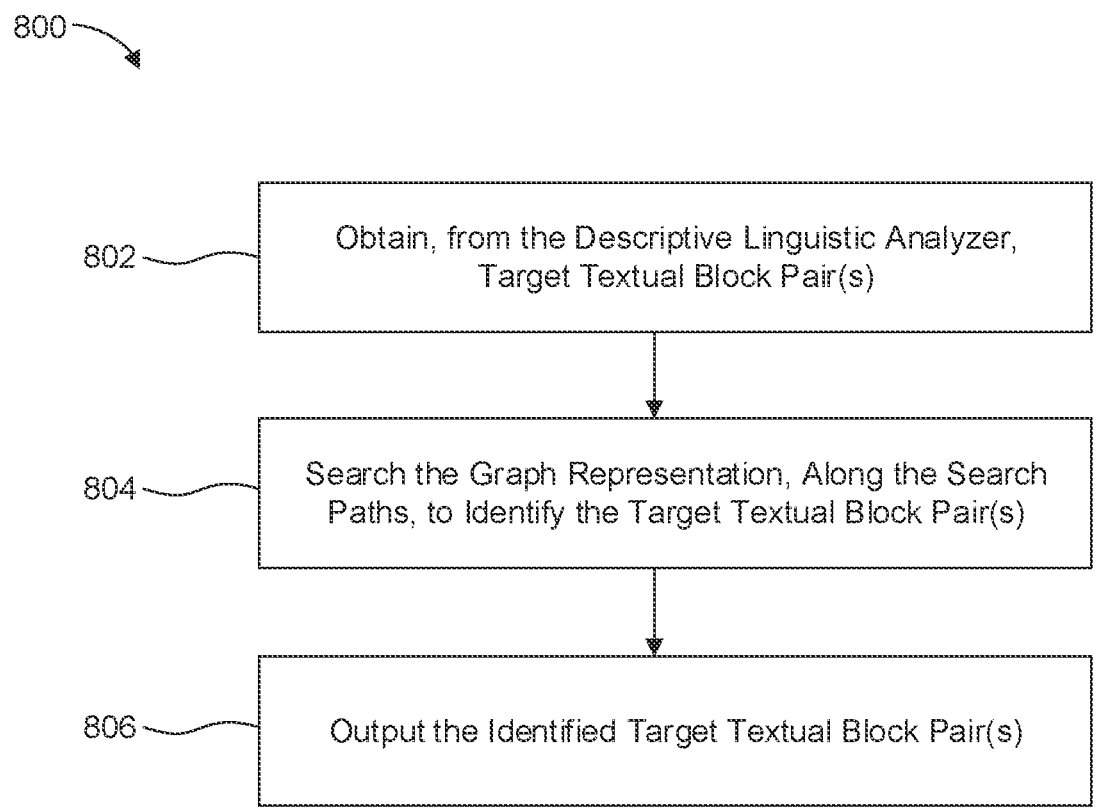
FIG. 8 is a flowchart diagram illustrating a process of processing a document according to an example embodiment.

FIG. 8 is a flowchart diagram illustrating a process 800 of processing a document according to an example embodiment. Process 800 includes operations 802, 804, and 806. The process 800 can be considered as a process that is downstream from process 200 described above in connection with FIG. 2. In other words, operation 802 can follow operation 212 of FIG. 2 or operation 704 of FIG. 7.

At operation 802, one or more target textual block pairs are obtained from the descriptive linguistics analyzer 118. In turn, at operation 804, the graph representation is searched along the search paths to identify the target textual block pairs. The identified target textual block pair(s) are then output, as shown at operation 806.

In some embodiments, searching the graph representation along the search paths to identify the target textual block pairs includes locating a first textual block, searching the graph representation, starting from the first textual block and along one of the plurality of horizontal search paths, and searching the graph representation, starting from the first textual block and along one of the plurality of vertical search paths. In an example implementation, the graph representation can be searched until a predetermined criterion is met. An example predetermined criterion can be, for example based on one of the target textual block pairs is identified. Thus searching the graph representation can be stopped after one of the target textual block pairs is identified.

In yet another example implementation, the predetermined criterion can be based on whether a first number of textual blocks have been searched. Thus, in this example embodiment, the searching of the graph representation is stopped after a first number of textual blocks have been searched.

In some embodiments, a semantic module can be used to define what needs to be searched or associated in the document. In some example use cases, the associations are one to one such that one textual block (e.g., SSN) is associated with only one other textual block (e.g., 999-99-9999). In some use cases one textual block (e.g., "Grocery Items") is associated with multiple textual blocks (e.g., apples, potatoes, etc.). In other embodiments multiple textual blocks ("Quarterly Sales", "June 2020") are associated with a single text block (e.g., $120 MM). These association possibilities are provided to semantic module at design stage of the extraction.

In yet another embodiment, for one to many associations, all first, second and other ordinal associations are grouped into a record.

A textual signature is a spatial pyramid of characters that represents the same semantic meaning. In some embodiments, one or more textual signatures of the different values (semantics) for an entity that can be manifested in a textual block are input to the semantic module. For example, a date could be represented in various textual signatures (mm/dd/yy or DAY of MONTH, YYYY). In addition, the textual signature may include different types of values. For example, an entity in a textual block can be composed of different parts where each part represents a distinct piece of information (e.g., social security numbers are of the form 999-99-9999, where the first set of three digits is the Area Number, the second set of two digits is called the Group Number and the final set of four digits is the Serial Number). In one embodiment, the textual signatures could be provided using the regular expression string syntax. In other embodiment, the textual signatures can be provided by user-defined predicate functions or small software modules. In a third embodiment, the textual signatures could simply be provided as an enumerated list of all possible values.

With the combination of the geometrically aligned textual blocks (i.e., the graph), their associated search paths (referred to as "walks"), the textual signatures of the entities, aspects of the embodiments being matching the textual signatures of blocks provided by the semantics module along the search paths. In some examples, the search path is to look to the right search path of an entity for a match and then to the bottom search path of the entity if a match is not found. The search can continue, for example, for multiple matches even if a match has been established. Alternatively, the search direction can be altered from the nominal (right and down) to user defined directions and the order of those direction. For example, the module could be instructed to look in the top search direction first and then to the left direction. This is useful for reverse lookups where first any textual entity that has the signature (for example, a date) is determined and then the corresponding matching description for the date (Maturity Date) is searched.

In yet another embodiment, a search can continue for a finite set of comparisons irrespective of if there is a match. For example, look only two blocks to the left and then stop searching.

In another embodiment, the search continues until a user defined stopping criterion is met. The stopping criterion normally is to stop when there are no more blocks along the search direction. However, another stopping criterion could be at first non-match of the signature. Another stopping criteria could be when finite number of matches has been reached.

Once the above search and match process is completed, the matched entities can be output for further processing.

As evident by the above detailed procedure, example embodiments can be used to extract and associate information from any form-like document. The association is made by the geometry and proximity of the entities. The extraction is not specific to any template. The extraction is resilient to changes in the template (for example, the module can extract the information whether the SSN: 999-99-9999 in the top right of the document or in the middle or at the bottom) or changes in the semantics of the template (if Social Security Number is spelled out as compared to abbreviated "SSN").

The systems and methods described herein can be applied to any form-like documents. By increasing the semantic understanding of the various common terms in a specific domain it can be extended and quickly reused to extract form data from any domain. The geometric module-construction of the textual blocks, connections of the blocks and construction of the search paths along with the signatures for searching and association of the entities enable more accurate geometric extraction.

Depending on the textual sequence of the block (e.g., email vs. stock picks), the machine learning algorithm could continue the search path through multiple blocks or end after a finite number of blocks. The machine learning model is trained on a correspondence score of the content of each of the plurality of the textual blocks. The correspondence score could be trained using match to a regular expression pair, trained using the similarity of a language model (e.g., word2vec, contextual language model generated embeddings. For example, from ELMo, BERT, RoBERTa and others) or trained using a sequence-to-sequence neural networks that may use techniques such as RNNs or Transformers. Descriptive linguistic models can utilize the language representation of words and characters in spoken (prose-like) language A geometric analyzer can utilize geometric relationships between objects whether the objects are textual, pictorial or a combination. In some embodiments, the machine learning kernel 126 utilizes the training data to learn the correspondence between textual blocks utilizing combinations of both the geometric analyzer representations and the descriptive linguistic representations. Furthermore, the kernel also learns the appropriate geometric search paths along which the correspondence scores are most likely to be maximum.

Figure 9:
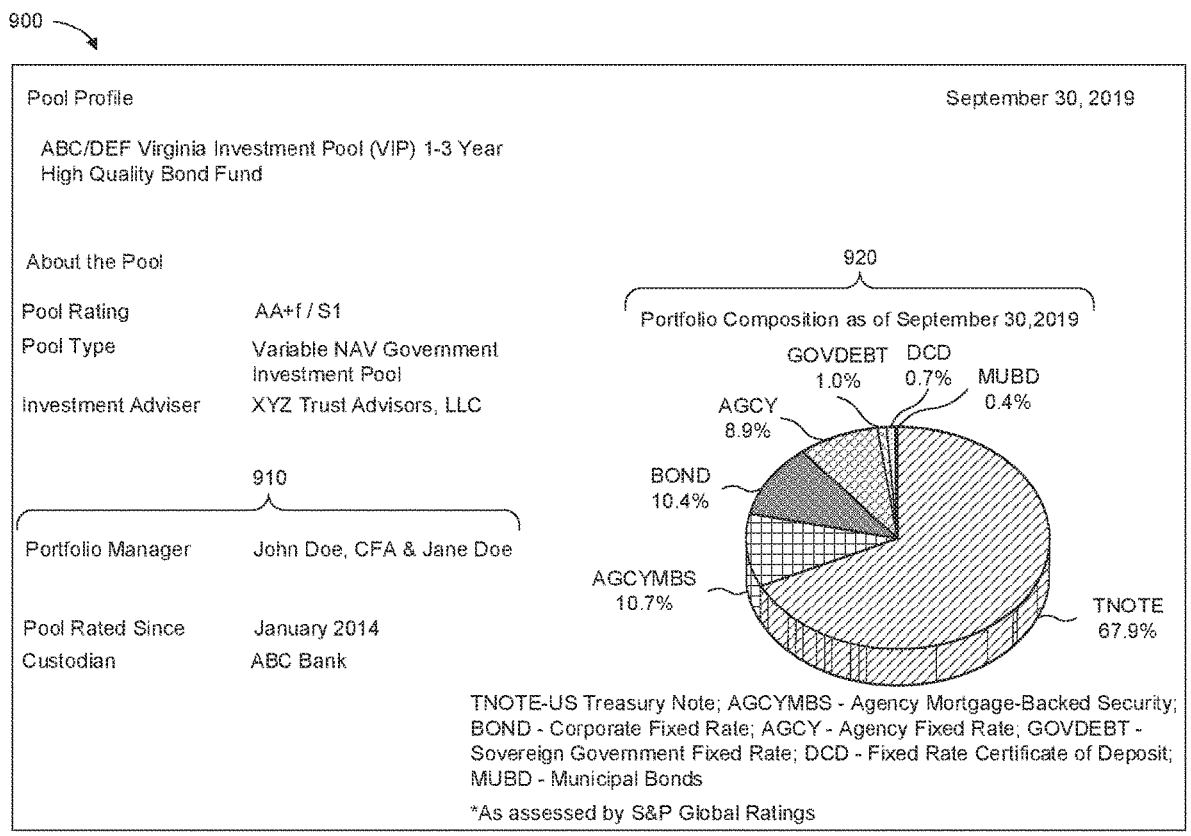
FIG. 9 is a diagram illustrating an example document.

FIG. 9 is a diagram illustrating an example document 900. FIG. 10 is a data extraction result 1000 corresponding to the document 900 of FIG. 9. The example document 900 can be, for example, a PDF formatted document. The example document 900 can also be, for example, an Excel formatted document. What the document relates to is not important. In this example, document 900 relates to a bond fund and the document indicates various attributes related to a particular profile referred to as a Pool Profile. In this particular example the document indicates, among other information, who are the portfolio managers 910. Notably, one of the portfolio managers is associated with a certification while the other is not. The document further indicates the portfolio composition along with associated details 920. In this example use case the document illustrates information both in textual format and graphically (e.g., the pie chart). It should be understood that other formats can be used.

In an exemplary implementation, the data extraction result 1000 is a record of associations of the elements extracted from document 900. the data extraction result can include an identifier identifying the data extraction result, Document identifier (ID) 1002, and a time of data extraction, Data Extraction Time 1004. In an example embodiment, the data extraction result 1000 includes a confidence score 1008. As explained above, a confidence score 1008 is the probability that the associations generated by the geometric extractor are related. In some embodiments, a confidence score for each title:value pair is determined and all the confidence scores are aggregated for the unstructured document to generate the confidence score 1008 (also referred to as an aggregated confidence score 1008). In some embodiments each confidence score can be presented for individual correspondences (e.g., individual title:value pairs).

In some embodiments, the data extraction result 1000 generated by the data extraction system 110 is an electronic file. In an example implementation, the electronic file includes a selector which, when selected via an interface, operates to cause an operation to be performed. In the example shown in FIG. 10, the selector 1010 is a review selector and the operation causes the original document 900 to be open via an interface (e.g., I/O interface 198) for review the information thereon. This allows for visual verification against the extraction result 1000. In some embodiments, extraction result 1000 is enabled to receive changes to any element, such as any title 1005 (e.g., State 1005-1, Investment Advisor 1005-2, Portfolio Manager 1005-3, Portfolio Manager Name 1005-4, Portfolio Manager Title/Certification/Degree 1005-5, Custodian 1005-6, Portfolio Composition As of Date 1005-7, Portfolio Composition 1005-8), first value 1006 (e.g., corresponding value #1: 1006-1, 1006-2, 1006-3, 1006-4, 1006-5, 1006-6, 1006-7, and 1006-8), second value 1007 (e.g., corresponding value #2: 1007-1, 1007-2, 1007-3, 1007-4, 1007-5, 1007-6, 1007-7, and 1007-8). Any corrections made can entered into extraction results 1000 can be read by a machine learning processor and used to train a model. The training data can be stored in database 120. Such supervised training schema enabled geometric extraction system 110 to improve over time. While training data is used to create a machine learning kernel and use it, such visual verification systems provide auxiliary training data for improvement of the machine learning kernel performance by including the changed extraction result in the training set and retraining the machine learning kernel to learn from the corrections made. This retraining could be initiated either on a periodic basis or after a certain threshold number of corrections.

In some embodiments, information fields are title:value pairs. In the example of FIG. 10, a title 1005 can have a first value 1006 and a second value 1007. In addition, data extraction system 110 may determine that a title 1005 has one or more overlapping values 1006-3, 1006-4, 1006-5. In the example depicted in FIG. 10, for example, it may be the case that at least one of the elements of information on document 900 consists of a single title:value pair (e.g., title:Portfolio Manager corresponds to value: "John Doe, CFA & Jane Doe"). Alternatively, data extraction system 110 may detect that a particular element of information corresponds to more than one title as in this example. In this example, it may be the case that the title Portfolio Manager 910 can be associated with more than one title, such as Portfolio Manager 1005-3, Portfolio Manager Name 1005-4 and Portfolio Manager Certification 1005-5. Thus, in this case, a first title may be associated with the entire value associated with it based on geometry alone or based on one or more combinations of the information on the document.

In some embodiments, the present disclosure includes a computer program product which is a non-transitory storage medium or computer-readable medium (media) having instructions stored thereon/in which can be used to program a computer to perform any of the processes of the present. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present disclosure has been provided for the purposes of illustration and description. It is not intended to be exhaustive or to limit the disclosure to the precise forms disclosed. Many modifications and variations will be apparent to the practitioner skilled in the art.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for processing a document having one or more pages, comprising:
   receiving an unstructured document;
   recognizing a plurality of textual blocks on at least a portion of a page of the unstructured document;
   generating a plurality of bounding boxes, each bounding box surrounding and corresponding to one of the plurality of textual blocks and having coordinates of a plurality of vertices;
   determining a plurality of search paths, each search path having coordinates of two endpoints and connecting at least two bounding boxes; and
   generating a graph representation of the at least a portion of the page, the graph representation including the plurality of textual blocks, the coordinates of the plurality of vertices of each bounding box and the coordinates of the two endpoints of each search path.

2. The method of claim 1, wherein the plurality of search paths include a plurality of horizontal search paths and a plurality of vertical search paths.

3. The method of claim 2, wherein the plurality of horizontal search paths and the plurality of vertical search paths span across a plurality of pages of the unstructured document.

4. The method of claim 2, wherein the searching includes, in order:
   locating a first textual block;
   searching the graph representation, starting from the first textual block and along one of the plurality of horizontal search paths; and
   searching the graph representation, starting from the first textual block and along one of the plurality of vertical search paths.

5. The method of claim 1, wherein the at least two bounding boxes include a first bounding box, a second bounding box, and at least one intermediate bounding box between the first bounding box and the second bounding box.

6. The method of claim 1,
   wherein the plurality of bounding boxes are rectangular bounding boxes; and
   wherein the plurality of vertices are one of:
      four vertices of each rectangular bounding box, and
      two opposite vertices of each rectangular bounding box.

7. The method of claim 1, wherein the plurality of bounding boxes are generated by a machine learning kernel, and the plurality of search paths are determined by the machine learning kernel.

8. A method according to claim 1, further comprising:
   obtaining, from a descriptive linguistics engine, a plurality of target textual block pairs, each target textual block pair including a title textual block and at least one corresponding value textual block;
   searching the graph representation, along the plurality of search paths, to identify at least one of the target textual block pairs; and
   outputting the identified at least one of the target textual block pairs.

9. The method of claim 8, wherein the plurality of target textual block pairs are generated by the machine learning kernel.

10. The method of claim 1, further comprising:
    searching the graph representation until a predetermined criterion is met.

11. The method of claim 10, further comprising:
    stopping searching the graph representation after one of the target textual block pairs is identified.

12. The method of claim 10, further comprising:
    stopping searching the graph representation after a first number of textual blocks have been searched.

13. A system for extracting data from a document having one or more pages, comprising:
    a processor;
    an input device configured to receive an unstructured document;
    a machine learning kernel coupled to the processor;
    a geometric engine coupled to the machine learning kernel and configured to:
       recognize a plurality of textual blocks on at least a portion of a page of the unstructured document;
       generate a plurality of bounding boxes, each bounding box surrounding and corresponding to one of the plurality of textual blocks and having coordinates of a plurality of vertices;
       determine a plurality of search paths, each search path having coordinates of two endpoints and connecting at least two bounding boxes; and
       generate a graph representation of the at least a portion of the page, the graph representation including the plurality of textual blocks, the coordinates of the plurality of vertices of each bounding box, and the coordinates of the two endpoints of each search path;

a descriptive linguistics engine coupled to the machine learning kernel and configured to:

generate a plurality of target textual block pairs, each target textual block pair including a title textual block and at least one corresponding value textual block; and search the graph representation, along the plurality of search paths, to identify at least one of the target textual block pairs; and an output device configured to output the identified at least one of the target textual block pairs.

14. The system of claim 13, wherein the plurality of search paths include a plurality of horizontal search paths and a plurality of vertical search paths.

15. The system of claim 14, wherein the plurality of horizontal search paths and the plurality of vertical search paths span across a plurality of pages of the unstructured document.

16. The system of claim 13, wherein the descriptive linguistics engine is further configured to:

search the graph representation until a predetermined criterion is met.

17. A non-transitory computer-readable medium having stored thereon one or more sequences of instructions for causing one or more processors to perform:

receiving an unstructured document;

recognizing a plurality of textual blocks on at least a portion of a page of the unstructured document;

generating a plurality of bounding boxes, each bounding box surrounding and corresponding to one of the plurality of textual blocks and having coordinates of a plurality of vertices;

determining a plurality of search paths, each search path having coordinates of two endpoints and connecting at least two bounding boxes; and generating a graph representation of the at least a portion of the page, the graph representation including the plurality of textual blocks, the coordinates of the plurality of vertices of each bounding box and the coordinates of the two endpoints of each search path.

18. The non-transitory computer-readable medium of claim 17, wherein the plurality of search paths include a plurality of horizontal search paths and a plurality of vertical search paths.

19. The non-transitory computer-readable medium of claim 18, wherein the plurality of horizontal search paths and the plurality of vertical search paths span across a plurality of pages of the unstructured document.

20. The non-transitory computer-readable medium of claim 17, wherein the at least two bounding boxes include a first bounding box, a second bounding box, and at least one intermediate bounding box between the first bounding box and the second bounding box.

* * * * *